April 21, 1936.    J. O. HALE ET AL    2,037,783
SNAP HOOK
Filed April 9, 1935

Inventors:
John O. Hale,
Kenneth J. Hall,
by Walter E. Lombard,
Atty.

Patented Apr. 21, 1936

2,037,783

UNITED STATES PATENT OFFICE 2,037,783

SNAP HOOK

John O. Hale and Kenneth J. Hall, Worcester, Mass.

Application April 9, 1935, Serial No. 15,387

12 Claims. (Cl. 24—237)

This invention relates to snap-hooks and particularly to hooks designed to secure cross links to the circumferential chains of an anti-skid device for automobile tires, the object being to provide a hook which may be quickly attached and detached from the ends of the cross links and also from the links of the circumferential chains.

Another object is to form said hook from substantially flat spring metal, one surface of which will be flat upon the surface of the tire, thereby preventing injury thereto when in use.

Another object is in providing the snap-hook with link-engaging terminal hooks extending in opposite directions and normally in contact.

These objects are attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing—

Similar characters indicate like parts throughout the several figures of the drawing.

Figure 1:
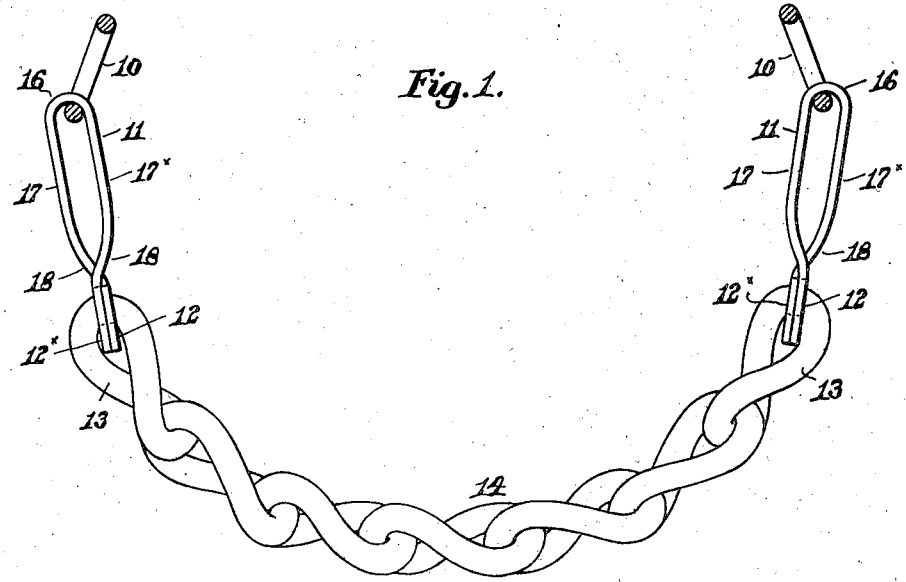
Figure 1 represents an elevation of the cross links of an anti-skid device and showing at opposite ends thereof and attached thereto snap-hooks mounted on links of the usual circumferential chains of said anti-skid device.
Figure 2:
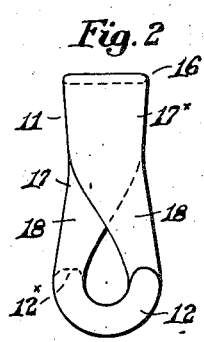
Figure 2 represents a plan of the snap-hook.

In the drawing, 10, 10 are links forming parts of the usual circumferential chains of an anti-skid device and 11, 11 are snap-hooks attached at one end to the links 10, 10 and extending therefrom, the opposite ends of said snap-hooks being provided with overlapping hook elements 12, 12x to connect with the end links 13 of a cross chain 14.

Figure 6:
Figure 6 represents a section of line 6—6 on Fig. 3.

The snap-hook 11 is made of spring steel nearly flat in cross section, the opposite faces of which may be slightly curved as indicated at 15 in Fig. 6 to prevent injury to the tire when contacting therewith.

The snap-hook 11 is provided at one end with a loop 16 encircling one portion of the link 10.

From the loop 16 extend arms 17, 17x which are parallel and widely separated, one arm being immediately above the other.

Figure 3:
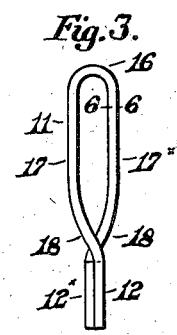
Figure 3 represents a side elevation of the same when closed.
Figure 4:
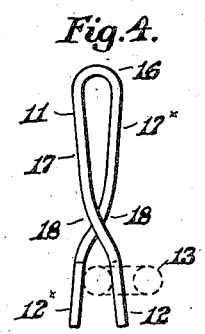
Figure 4 represents a side elevation of the same when open to admit a link for engagement with the oppositely extending terminal hooks thereof.

These arms 17, 17x have intermediate the ends thereof bends 18 crossing each other, as shown in Figs. 3 and 4.

The arms 17, 17x where they cross each other are made narrower and terminate in the hook elements 12 which normally are retained in contact by the spring of the metal of which the snap-hook is formed. The narrowed portions of the arms 17, 17x are curved outwardly with a space between them communicating with the space between the parallel portions of said arms.

Figure 5:
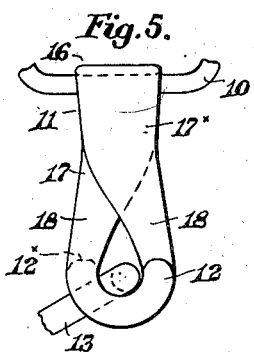
Figure 5 represents a plan of the snap-hook with a link in engagement with one of the terminal hooks.

These hook elements extend in opposite directions as shown in Figs. 3 and 5.

Owing to the crossing of the arms 17, 17x the hook 12 on the left arm 17 (see Fig. 3) is disposed on the right of the hook 12x of the arm 17x.

Consequently, when the arms 17, 17x where widely separated have pressure applied thereto to force them toward each other, the hook elements 12, 12x are forced apart, as indicated in Fig. 4.

When the hook elements 12, 12x are separated in this manner, a link 13 may be inserted between them and by proper manipulation engaged first with one hook element and then the other or the link 10 of the circumferential chain may be inserted in the same manner and moved between the arms 17, 17x until it engages and is enclosed by the loop 16, as shown in Fig. 7.

Then by releasing the pressure on arms 17, 17x the hook elements 12, 12x will snap together and be held in contact, making it impossible to disconnect accidently either the link 10 or the link 13 from the snap-hook.

The snap-hook is made of durable spring steel so it can be used for an indefinite period and the cross links may be connected to the snap-hook and disconnected therefrom without removing the snap-hook from the links 10 of the circumferential chains.

This is of considerable advantage as it makes the assembling of the cross links 14 to the circumferential chains 10, 10 much easier to accomplish.

While the snap-hook is particularly designed for use in securing cross links 14 to the circumferential chains 10 of anti-skid devices, it is obvious that the same hook might be utilized for many other purposes.

In some cases the hook could be made of such spring metal that the pressure on the separated parts of the arms 17, 17x in order to separate the hook elements 12, 12x could be applied by means of the thumb and forefinger.

In the snap-hooks to be used in connection with the anti-skid devices, the metal is heavier and ordinarily the pressure could not be applied by means of the thumb and forefinger but it would be necessary to squeeze the parts together by means of pinchers or some similar tool usually carried by the driver of an automobile.

The snap-hook may be made cheaply and is very effective in operation.

It is believed that the operation and many advantages of the invention will be understood without further description.

Having thus described our invention, we claim—

1. A device of the class described consisting of a U-shaped member of spring metal with substantially flat widely separated parallel arms terminating in outwardly curved separated portions crossing each other intermediate their length and having at their outer ends overlapping hook elements parallel to said arms extending in opposite directions with their side faces normally in contact, said hook elements being movable only in a direction perpendicular to the contacting faces thereof.

2. A device of the class described consisting of a substantially broad U-shaped member of spring metal with broad parallel arms widely separated at one end and provided at their outer ends with separated outwardly curved portions crossing each other intermediate their length and having contacting flat-faced hook elements at the outer ends thereof overlapping each other and extending in opposite directions, said hook elements being movable only in a direction perpendicular to the contacting faces thereof.

3. A device of the class described consisting of a substantially broad U-shaped member of spring metal with broad parallel arms widely separated at one end and provided at their outer ends with separated outwardly curved portions crossing each other intermediate their length and having contacting flat-faced hook elements at the outer ends thereof overlapping each other and extending in opposite directions, said hook elements being movable from each other in a direction perpendicular to the contacting faces thereof by moving the parallel portions of said arms toward each other.

4. A device of the class described consisting of a substantially broad U-shaped member of spring metal with broad parallel arms widely separated at one end and crossing each other intermediate their ends and having diverging narrower portions separated from each other and terminating in oppositely extending flat-faced hooks overlapping each other and normally in contact, said hooks being movable apart in a direction perpendicular to the flat faces of said hooks by pressing said arms toward each other.

5. A device of the class described consisting of a substantially broad U-shaped member of spring metal with broad parallel arms widely separated at one end and crossing each other intermediate their ends and having diverging narrower portions separated from each other and terminating in oppositely extending flat-faced contacting hooks overlapping each other and separable in a direction perpendicular to the faces of said arms by applying inward pressure to the parallel portions of said arms.

6. A device of the class described consisting of a substantially broad U-shaped member of spring metal with widely separated parallel arms having separated bends therein crossing each other intermediate their length and terminating in overlapping hook elements extending in opposite directions and normally in contact, the loop end of said member being wide and adapted to encircle a straight portion of a chain link and said hook elements being movable only in a direction perpendicular to the contacting faces thereof.

7. A device of the class described consisting of a substantially broad U-shaped member of spring metal, the loop portion of which is wide and adapted to enclose a link of a side chain of an anti-skid device, the arms of said loop portion being parallel and widely separated with their outer ends crossing each other and having overlapping flat-faced terminal hooks extending in opposite directions and normally in contact, said hooks being movable apart in a direction perpendicular to the contacting faces of said hooks in order to receive and then enclose an end link of a cross chain of said anti-skid device when said hooks have returned into contact.

8. A device of the class described consisting of a member of spring metal having at one end a loop portion to enclose a link of a side chain of an anti-skid device and provided at the opposite end with overlapping contacting hooks extending laterally in opposite directions and adapted to be separated by pressing the arms of said member toward each other to permit said hooks to receive an end link of a cross chain of said anti-skid device, the portions of said member between said loop and hooks being spaced from each other under all conditions.

9. A device of the class described consisting of a wide plate of spring metal bent U-shaped at one end with parallel widely separated arms crossing each other at points intermediate their length and terminating in flat hook elements extending in opposite directions and normally retained in contact by the spring tension of said arms.

10. A device of the class described consisting of a U-shaped member of spring metal with a loop at one end having extending therefrom arms terminating at their outer ends in outwardly curved portions crossing each other intermediate their lengths and having overlapping hook elements at the ends thereof extending laterally in opposite directions and normally in contact, said arms and curved portions being separated normally from said loop to the contacting hook elements.

11. A device of the class described consisting of a U-shaped member of spring metal with widely separated parallel arms terminating in outwardly curved separated portions crossing each other intermediate their length and having at the outer ends thereof overlapping hook elements normally in contact and extending in opposite directions, said hook elements having movement only in a direction perpendicular to the contacting faces thereof.

12. A device of the class described consisting of a U-shaped member of spring metal with widely separated parallel arms terminating in outwardly curved separated portions crossing each other intermediate their length and having at the outer ends thereof overlapping hook elements extending in opposite directions, said hook elements having movement only in a direction perpendicular to the contacting faces thereof, the hook element of the upper arm being disposed beneath the hook element of the lower arm and normally in contact therewith.

JOHN O. HALE.
KENNETH J. HALL.